April 2, 1940.                H. F. VICKERS ET AL                2,195,547
                              MULTIPLE CONDUIT JOINT
                                Filed Oct. 2, 1937

INVENTORS
HARRY F. VICKERS
JESSE R. MOSER
BY   JOSEPH A. MARTIN
     Ralph L. Tweedale
     ATTORNEY Patented Apr. 2, 1940

2,195,547

UNITED STATES PATENT OFFICE 2,195,547

MULTIPLE CONDUIT JOINT

Harry F. Vickers, Washington, D. C., and Jesse R. Moser and Joseph A. Martin, Detroit, Mich., assignors to Vickers Incorporated, Detroit, Mich., a corporation of Michigan Application October 2, 1937, Serial No. 166,910

1 Claim. (Cl. 285—23)

This invention relates to power transmissions and more particularly to those of the type comprising one or more fluid pressure energy translating devices, one of which may function as a pump and another as a fluid motor. Transmissions of this character frequently involve complex hydraulic circuits requiring the use of many separable piping connections between the various fluid pressure energy translating devices and control valves, etc. The fluid pressures which are generated in such conduits are frequently rather high, many systems in use today operating at pressures upwards of one thousand pounds per square inch.

It has heretofore been almost universal in the art to utilize various forms of flanged couplings where it is necessary to attach high pressure conduits to the various mechanisms incorporated in the hydraulic circuit and these couplings in order to withstand high pressures are necessarily bulky and heavy if leakage is to be avoided at high operating pressures. This is partly caused by the fact that the flanges and connecting bolts must not only withstand the axial separating force of the internal fluid pressure but, in addition, must subject the gasket between the flanges to a high compressive force. In addition, where several conduits are to be connected to a single member such as a valve or a pump in closely spaced relationship, the coupling means of the prior art not only require wide spacing between adjacent conduits but are difficult to assemble and disassemble where more than two conduits are situated adjacent one another. While it is theoretically possible to provide a common flange connection for several conduits, this is entirely unfeasible in practice because of the close tolerances required in order to subject the gaskets to equal pressures around each conduit and due to the difficulty of providing a flange sufficiently rigid to resist warpage when provided with fastening bolts only around its outer periphery as is necessary where several conduits are grouped together in a single flange.

It is an object of the present invention therefore to provide an improved means for connecting two portions of one or several conduits which provides reliable sealing of fluid under high pressures, which is less bulky and heavy than coupling devices heretofore available, and which does not require the bolts or other connecting means to be stressed beyond that imposed by the axial separating force of the pressure fluid.

A further object is to provide a means for connecting together a plurality of pairs of conduit portions in closely spaced relationship in which a fluid-tight seal is maintained independently of the axial position of any conduit portion relative to its mating conduit portion.

A further object is to provide a pipe connecting means of the character described which may be repeatedly assembled and disassembled and in which normally occurring inaccuracies in alignment between two mating portions of the conduit do not affect the seal between the conduit portions connected.

A further object is to provide a means for structurally and hydraulically connecting two members each containing a plurality of conduits and providing a common, exteriorly smooth, housing for the conduits which may be completely closed; which provides a tight seal between the mating portions of all conduits as well as accurate structural positioning and support between the two members, by a simple assembling operation involving no more complication than would be involved if the two members were merely structurally joined without providing conduit connections as well.

Further objects and advantages of the present invention will be apparent from the following description, reference being had to the accompanying drawing wherein a preferred form of the present invention is clearly shown.

Figure 1:
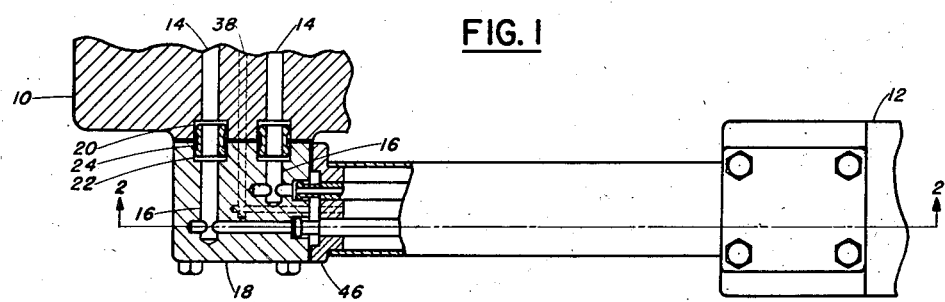
Fig. 1 is a top view, partly in section, of a portion of a power transmission system incorporating a preferred form of the present invention.
Figure 2:
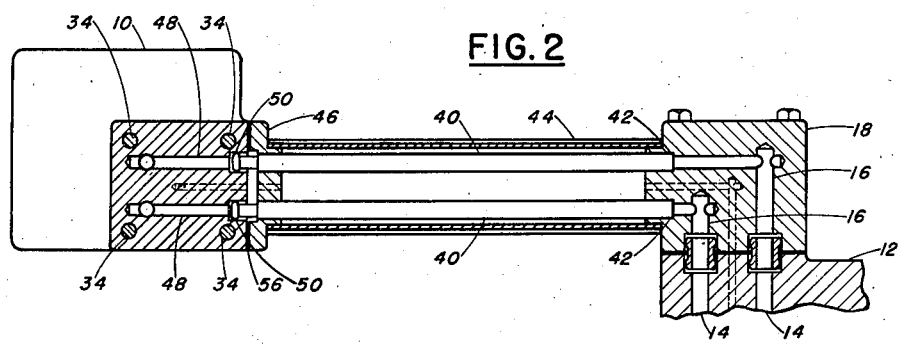
Fig. 2 is a cross section on line 2—2 of Fig. 1.

Referring now to Figs. 1 and 2, 10 indicates a fluid pressure energy translating or controlling device of any suitable construction forming part of a hydraulic power transmission circuit while 12 indicates another device of the same character to which the device 10 is to be connected both structurally, for positioning and support, as well as hydraulically to provide a plurality of conduits communicating between the devices. For purposes of illustration the devices 10 and 12 are shown as being connected by four conduits although it will be understood that the principles of the invention are applicable as well where a greater or less number of connecting conduits are required. Thus, each of the conduits has a portion 14 in the devices 10 and 12 which are in alignment with corresponding or mating portions 16 in elbow blocks 18. The open ends of the conduit portions 14 and 16 which face each other are provided with cylindrical recesses 20 and 22 within which are positioned removable cylindrical sleeves 24.

Figures 3, 4:
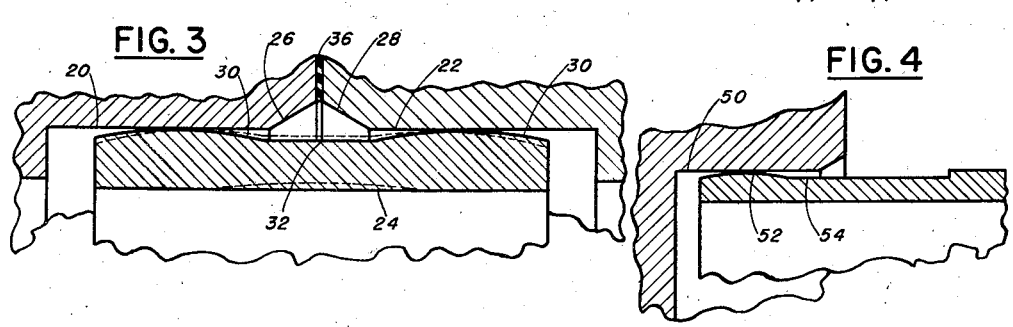
Fig. 3 is a fragmentary cross section on a larger scale of one form of pipe coupling means shown in Fig. 1.
Fig. 4 is a view corresponding to Fig. 3 showing a second form of the pipe coupling means illustrated in Fig. 1.

The construction of this portion of the mechanism is illustrated in detail in Fig. 3 from which it will be seen that the recesses 20 and 22 are provided with outwardly tapered entrance openings at 26 and 28 to assist entrance of the sleeves 24 in the recesses at assembly. The sleeves 24 are each provided with a frustro-spherical outer surface at 30 adjacent each end of the sleeve and with a reduced neck portion 32 intermediate the frustro-spherical portions 30. The diameter of the portions 30 is made such as to provide a slight press fit. As an example of the nature of the press fit which has been found suitable in practice, an interference of .0015 inch for a sleeve up to about 3 inches diameter is suitable while for larger sleeve diameters an interference of .0025 inch is satisfactory. The length of the sleeves 24 is preferably slightly less than the combined depth of the combined recesses 20 and 22 so that when the block 18 is drawn tightly against the face of the device 10, there will be no endwise compression of the sleeve 24. The interior of the sleeves 24 is, of course, hollow to provide another conduit portion affording communication between the conduit portions 14 and 16. The wall thickness of the sleeve 24 is so chosen with reference to the material from which it is made and to the material and thickness of the walls of the recesses 20 and 22, that, when the sleeve is subjected to fluid pressure, the sleeve will flex or expand faster than any expansion which can take place in the recesses 20 and 22. The material from which the sleeve 24 is made is also softer than the material of the walls of the recesses 20 and 22 which further insures faster expansion in the sleeve than in the recesses. The sleeve design is preferably such that the maximum operating stress is below the elastic limit of the material chosen.

To assemble the block 18 to the device 10 the four sleeves 24 are inserted between the tapered entrance openings 26 and 28 of the two members and bolts 34 are inserted and drawn up until the block 18 is in close engagement with the flat face of the device 10. A gasket 36 which surrounds the outer periphery of the block but does not surround the recesses 20 and 22 individually may be mounted between the block 18 and the device 10. The gasket is not essential to maintain a leakproof seal but may be desirable as an extra precaution in case any of the sealing surfaces has become damaged in handling. A conduit 38 may be provided in the device 10 and block 18 to communicate with the space inside the gasket 36 and return any leakage which might possibly get by the sleeves 24 to the sump or expansion tank of the system. In case one of the conduits 16 is a return conduit, that is, communicates with the tank then the sealing surfaces 30 in that conduit may be purposely damaged as by filing a flat thereon, to return such leakage in place of conduit 38.

Figure 5:
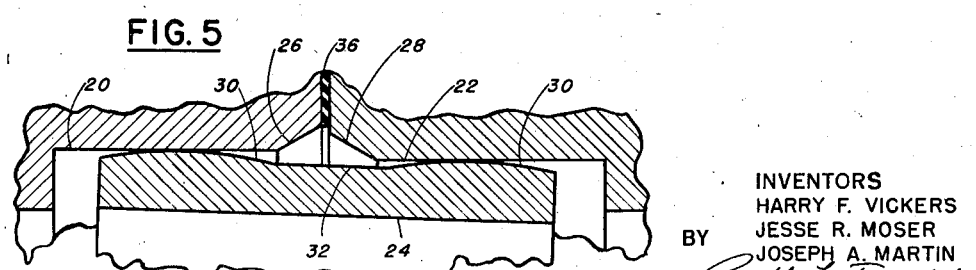
Fig. 5 is a view corresponding to Fig. 3 showing the same parts assembled with axial misalignment.

In operation of the connection between the conduit portions 14 and 16 the initial press fit with which the sleeves are assembled to the recesses 20 and 22 provides a seal at the point where the spherical portions 30 contact the recesses 20 and 22 which is effective to prevent any appreciable leakage at low operating pressures within the conduits. At higher pressures the sleeve 24 is subjected to an expansive force over that portion of the sleeve from the point where the spherical portion 30 contacts the recess 20 to the corresponding point in the recess 22. From these points to the ends of the sleeve the fluid pressure force is equalized in all directions so that there is no expansive force on the end portions of the sleeve. As the sleeve 24 expands under pressure, it tends to assume a shape such as that illustrated by dotted lines in Fig. 3. From this it will be seen that the area of contact between the spherical surfaces and the recesses is increased in the direction of the mid-portion of the sleeve 24 due to the action of the sleeve considered as a beam bending under uniform load. In addition, the original contact area which is provided at initial assembly is subjected to an increased sealing pressure due to the expansion of the sleeve 24 at this point considered as an expanding ring. It will be seen that due to the spherical shape of the surfaces 30 that even though the recesses 20 and 22 be considerably out of axial alignment when assembled that an initial seal is obtained due to the fact that the contact area always lies along a great circle of the spherical surface (see Fig. 5), even though it does not lie in a plane perpendicular to the sleeve axis. It will be noted that the bolts 34 are subjected only to the stress imposed by the separating force of the fluid in the conduit portions 14 and 16 acting in an axial direction plus whatever slight additional tightening is given to the bolts in order to compress the gasket 36. This latter force may be very small since the gasket is subjected only to the pressure existing in the sump or expansion tank which is only slightly, if any, above atmospheric pressure at all times.

The elbow block 18 which is attached to the device 12 is provided with extension conduit portions 40 which are preferably formed by pipes fused into bores 42 communicating with the conduit portions 16. Surrounding the extension conduits 40 is a tubular housing member 44 which may also be fused or otherwise securely attached to the block 18. At the left-hand end of the conduit extensions 40 and the tubing 44 there is provided a flange block 46 secured to the tube 44 and having bores through which the extension conduits 40 pass. The block 18 which is attached to the device 10 is provided with conduit portions 48 communicating with the conduit portions 16 and having recesses 50 at their open ends for the reception of the ends of the extension conduits 40.

The construction of the sealing mechanism at this point is somewhat similar to that previously described and is illustrated in detail in Fig. 4. Instead of providing separate internal sleeves to fit in recesses in both parts to be joined, the extension conduits 40 are provided with an end structure similar to one-half of the sleeves 24. These end structures thus comprise a frustro-spherical portion 52 behind which is a reduced neck portion 54 corresponding exactly to one of the frustro-spherical portions 30 and the neck portion 32 of the sleeve 24. The flange member 46 is secured to the block 18 by the usual connecting bolts, not shown, and is preferably provided with a gasket 56 similar to the gasket 36. The return conduit 38 extends through the flange member 46 to the interior of the tube 44 and may be further extended through the block 18 and into the device 12.

The operation of this form of connection may be readily understood from the operation of the connection previously described.

While the form of embodiment of the invention as herein disclosed, constitutes a preferred form, it is to be understood that other forms might be adopted, all coming within the scope of the claim which follows.

What is claimed is as follows:

In a multiple conduit joint for pipes having contacting flanged ends provided with mating recesses at the ends of the conduits and means for securing the flanges together, the combination of means for sealing the joint comprising sleeves adapted to be seated in the mating recesses in the flanges, said sleeves being provided at each end with a spherical enlargement having its center on the axis of the sleeve and providing for slight misalignment of the recesses of said flange.

HARRY F. VICKERS.
JESSE R. MOSER.
JOSEPH A. MARTIN.